United States Patent
Mazzella et al.

(10) Patent No.: US 12,402,754 B2
(45) Date of Patent: Sep. 2, 2025

(54) REVERSIBLE MIXING SHAFT AND ATTACHMENT FOR STAND MIXER

(71) Applicant: Haier US Appliance Solutions, Inc., Wilmington, DE (US)

(72) Inventors: Joseph Mazzella, Flushing, NY (US); Jeremy Michael Turner, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 716 days.

(21) Appl. No.: 17/736,242

(22) Filed: May 4, 2022

(65) Prior Publication Data
US 2023/0355039 A1    Nov. 9, 2023

(51) Int. Cl.
*A47J 43/07* (2006.01)
*A47J 43/044* (2006.01)
*A47J 43/08* (2006.01)

(52) U.S. Cl.
CPC ......... *A47J 43/0711* (2013.01); *A47J 43/044* (2013.01); *A47J 43/082* (2013.01); *A47J 2043/04454* (2013.01)

(58) Field of Classification Search
CPC .................................................. A47J 43/0711
USPC ........................................ 366/197, 331, 343
See application file for complete search history.

(56) References Cited

U.S. PATENT DOCUMENTS

| | | | | |
|---|---|---|---|---|
| 195,019 | A * | 9/1877 | Jones | A47J 43/0711 366/98 |
| 580,266 | A * | 4/1897 | Franklin | B01F 23/53 366/164.1 |
| 735,353 | A * | 8/1903 | Eifert | B01F 27/805 366/197 |
| 1,490,705 | A * | 4/1924 | Lauterbur | B01F 27/805 279/93 |
| 2,351,361 | A * | 6/1944 | Ockrant | D01G 9/14 366/331 |
| 2,723,110 | A * | 11/1955 | Collins | A47J 43/07 192/114 R |

(Continued)

FOREIGN PATENT DOCUMENTS

CN    211862582 U    11/2020
GB    2548082 A    9/2017

(Continued)

*Primary Examiner* — David L Sorkin
(74) *Attorney, Agent, or Firm* — Dority & Manning, P.A.

(57) ABSTRACT

A stand mixer is provided having a motor, an attachment support coupled to the motor, a mixing shaft coupled to the motor, a retractable plunger, and a mixing attachment. The mixing shaft may be rotatable by the motor. The retractable plunger may be extendable between a first position into the mixing shaft and a second position extending from the mixing shaft. The mixing attachment may be removably attached to the mixing shaft and may define a shaft channel for sliding receipt of the mixing shaft. The mixing attachment may also define an aperture connected with the with the shaft channel and configured for selective receipt of the retractable plunger. The mixing shaft can be inserted into the shaft channel and may be moved to selectively lock the mixing attachment to the mixing shaft by receipt of the retractable plunger into the aperture of the mixing attachment.

18 Claims, 6 Drawing Sheets

(56) References Cited

U.S. PATENT DOCUMENTS

| | | | | |
|---|---|---|---|---|
| 4,946,285 A | * | 8/1990 | Vennemeyer | B01F 27/951 |
| | | | | 366/288 |
| 6,439,760 B1 | * | 8/2002 | Langeloh | A47J 36/32 |
| | | | | 366/331 |
| 7,296,926 B2 | * | 11/2007 | Schnipke | B01F 27/071 |
| | | | | 403/324 |
| 2002/0181322 A1 | * | 12/2002 | Brunswick | B01F 27/071 |
| | | | | 366/331 |
| 2008/0223225 A1 | * | 9/2008 | Boozer | A47J 43/042 |
| | | | | 99/485 |

FOREIGN PATENT DOCUMENTS

| | | |
|---|---|---|
| IN | 234537 B | 7/2007 |
| SU | 1761447 A1 | 9/1992 |

\* cited by examiner

REVERSIBLE MIXING SHAFT AND ATTACHMENT FOR STAND MIXER

FIELD OF THE INVENTION

The present subject matter relates generally to appliances, and more particularly to stand mixer appliances.

BACKGROUND OF THE INVENTION

Stand mixers generally include a stand upon which a bowl is placed and a mixing device that rotates within the bowl. In some stand mixers, the mixing device is a removable attachment that attaches to a shaft, which may be attached to the stand. The shaft may be attached to a motor located within the stand, with the motor designed to rotate the shaft in one direction. Generally, the shaft is rotatable about a shaft axis and the shaft is further rotatable about a central axis to create planetary rotation.

Mixing attachments may be exchangeable. To secure the removable mixing attachments to the shaft during rotation, various features may be used to connect each mixing attachment to the shaft. For example, a mixing attachment may have features that allow for a secure attachment when the shaft is rotated in a forward direction (e.g., clockwise). Generally, shafts with removable attachments are not run in a reverse direction (e.g., counterclockwise), as such movement would be likely to loosen or even remove the mixing attachment from the shaft during the reverse motion.

Challenges exist in the design and use of mixing attachments. Mixing attachments need to be readily removable for cleaning but also securely attached while in use. Also, certain existing constructions may utilize a design that only secures the mixing attachments while being rotated in one direction. Rotation in the opposite direction may release the mixing attachments from the shaft. This is disadvantageous because some users may prefer a mixer that can be operated in both directions.

Accordingly, a stand mixer with the ability to rotate in more than one rotation direction would be desirable. A stand mixer with removable mixing attachments that was also capable of rotating in both clockwise and counterclockwise directions would be beneficial. A stand mixer that has a shaft and removable mixing attachments that can be readily aligned and locked together would also be beneficial.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a stand mixer is provided. The stand mixer may include a motor, a mixing shaft coupled to the motor and defining an axial direction, a retractable plunger, and a mixing attachment. The mixing shaft may be rotatable by the motor about the axial direction. The retractable plunger may be extendable between a first position into the mixing shaft and a second position extending from the mixing shaft. The mixing attachment may be removably attached to the mixing shaft. The mixing attachment may define a shaft channel extending along the axial direction for sliding receipt of the mixing shaft. The mixing attachment may also define an aperture connected with the with the shaft channel and configured for selective receipt of the retractable plunger when in the second position. The mixing shaft can be inserted into the shaft channel and may be moved along the axial direction to selectively lock the mixing attachment to the mixing shaft by receipt of the retractable plunger into the second position and into the aperture of the mixing attachment.

In another exemplary aspect of the present disclosure, a stand mixer is provided. The stand mixer may include a motor, a mixing shaft coupled to the motor and defining an axial direction, a retractable plunger, and a mixing attachment. The mixing shaft may be rotatable by the motor about the axial direction. The retractable plunger may be extendable between a first position into the mixing shaft and a second position extending from the mixing shaft. The mixing attachment may be removably attached to the mixing shaft. The mixing attachment may define a shaft channel extending along the axial direction for sliding receipt of the mixing shaft. The mixing attachment may also define an aperture connected with the with the shaft channel and configured for selective receipt of the retractable plunger when in the second position. The mixing shaft can be inserted into the shaft channel and may be moved along the axial direction to selectively lock the mixing attachment to the mixing shaft by receipt of the retractable plunger into the second position and into the aperture of the mixing attachment. The motor may be operable to selectively rotate the mixing attachment in a clockwise direction and a counter-clockwise direction around the axial direction.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Use of the same of similar reference numerals in the figures denotes the same or similar features unless the context indicates otherwise.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "includes" and "including" are intended to be inclusive in a manner similar to the term "comprising." Similarly, the term "or" is generally intended to be inclusive (i.e., "A or B" is intended to mean "A or B or both"). Approximating language, as used herein throughout the specification and claims, is applied to modify any quantitative representation that could permissibly vary without resulting in a change in the basic function to which it is related.

The terms "coupled," "fixed," "attached to," and the like refer to both direct coupling, fixing, or attaching, as well as indirect coupling, fixing, or attaching through one or more intermediate components or features, unless otherwise specified herein.

The present invention advantageously provides a mixer appliance with a secure mixing attachment coupling to a mixing shaft of the mixer appliance. This secure coupling may allow the mixer to rotate the shaft with the secured mixing attachment in clockwise and counterclockwise motions. In some embodiments, the ability to rotate mixing attachments in more than one direction may allow for faster, more complete, or more preferred mixing, blending, or other mechanical manipulation of articles mixed or otherwise manipulated by the mixer appliance.

Figure 1:
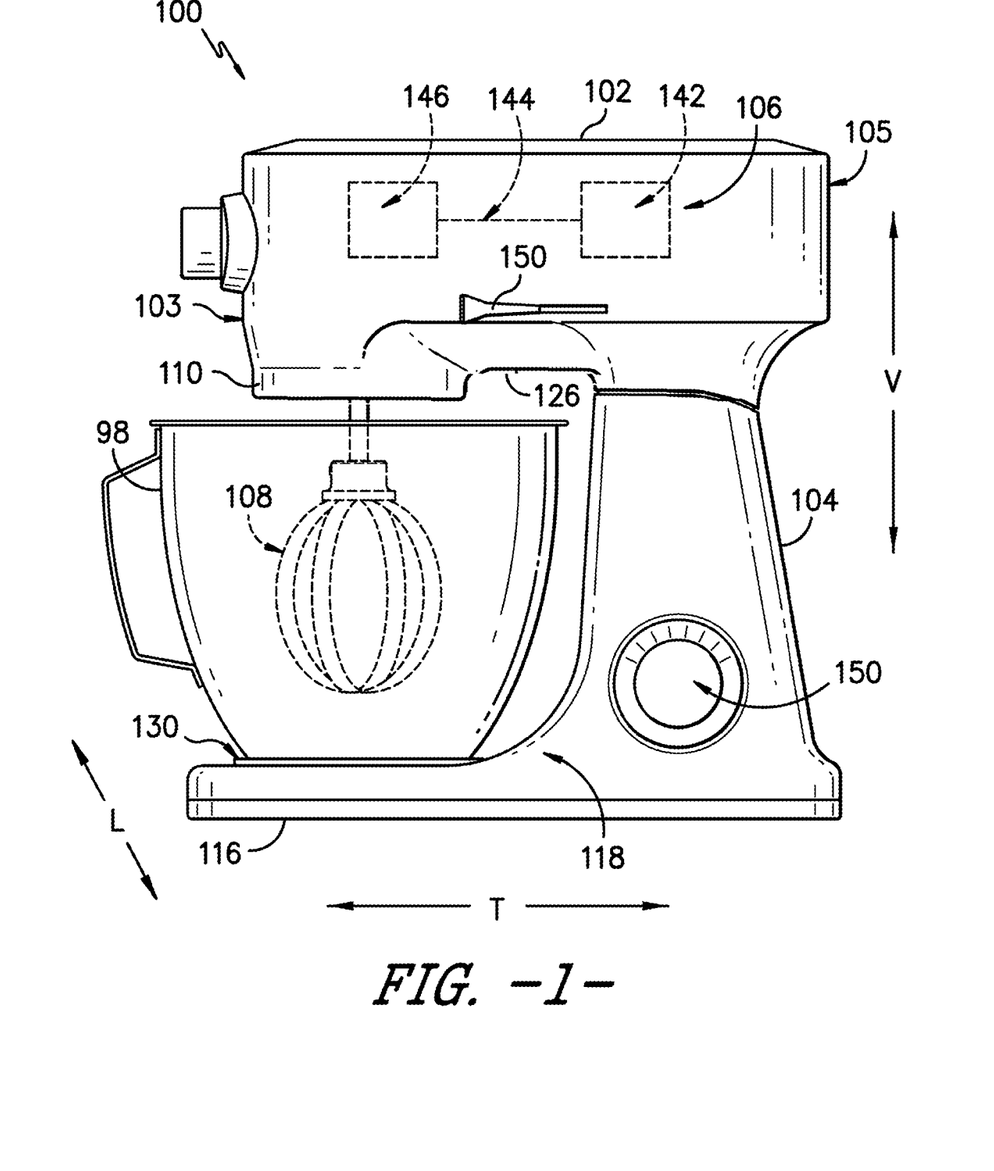
FIG. 1 provides a perspective view of an example stand mixer with a bowl according to exemplary embodiments of the present disclosure.

The figures depict an exemplary stand mixer appliance 100 that may be configured in accordance with various aspects of the present disclosure. It should be appreciated that the invention is not limited to any particular style, size, model, or shape for stand mixer appliance 100. The exemplary embodiment in FIG. 1 is for illustrative purposes only. For example, appliance 100 may have different shapes and appearance for one or more parts, different motor and gear configurations, and other differences while remaining within the scope of the claimed subject matter.

Figure 2:
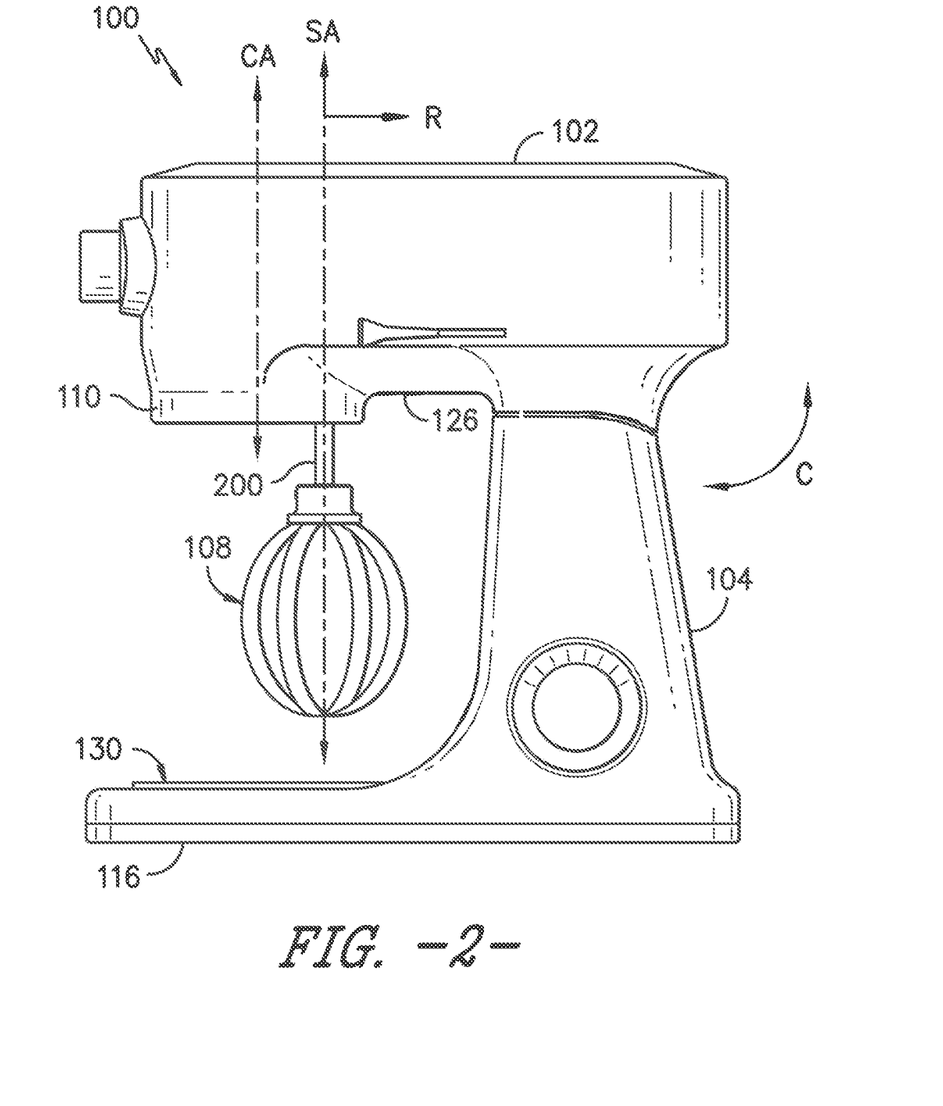
FIG. 2 provides a perspective view of the stand mixer with a mixing attachment according to exemplary embodiments of the present disclosure.

With reference for FIGS. 1 and 2, for the particular embodiment shown, mixer appliance 100 includes a head 102 and a base 104 with a casing 106 surrounding head 102. Stand mixer appliance 100 extends between head 102 and base 104 in a vertical direction V, across head 102 in a lateral direction L, and from a front 103 to a back 105 in a transverse direction T. The vertical direction V, lateral direction L, and transverse direction T are perpendicular to one another.

Head 102 is pivotally mounted to base 104 and extends transversely between front 103 and back 105 of stand mixer appliance 100 when in the mixing position shown in FIG. 1. In some embodiments, head 102 may be non-pivotably attached to base 104, but support members for bowl 98 (not shown) may raise and lower. Other configurations may be used to allow for access to bowl 98 or to a removable mixing attachment 108, as otherwise understood. For this embodiment, base 104 includes upright support 112 and a horizontal base member 116. As shown, upright support 112 extends vertically from horizontal base member 116 and horizontal base member 116 extends transversely in front of upright support 112.

Horizontal base member 116 includes a bowl seat 130 that may be rotatable about a vertical axis. In some embodiments, bowl seat 130 may be concave, grooved, or otherwise shaped to accept bowl 98. In some embodiments, support arms (not shown) or equivalent support structures may be used to hold bowl 98, as would be understood. Other shapes and constructions may be used for bowl stand 120 as well.

Head 102 includes an attachment support 110. A motor 142 is disposed within head 102 and enclosed by casing 106. Attachment support 110 is located on a lower portion or underside 126 of head 102 and forward of upright support 112 along transverse direction T. A mixing shaft 200 extends from attachment support 110. Removable mixing attachment 108 removably attaches to shaft 200.

Drivetrain 144 connects motor 142 with one or more gears 146 for causing rotation of attachment 108 or mixing shaft 200. Gears 146 may allow for selection by the user of different rotating speeds for attachment 108. As will be described in more detail below, mixing attachment 108 may be locked onto shaft 200 prior to rotation of shaft 200 by motor 142.

Appliance 100 may include one or more controls 150 for operations such as selectively powering motor 142, choosing the speed of rotation for attachments 108, locking position of head 102 relative to base 104 during mixing, or other features. In some embodiments, controls 150 may include a rotational direction operation selection, allowing a user to select the direction of rotation of the mixing shaft 200.

In certain embodiments, attachment support 110 may accept more than one attachment 108. Various types of attachments 108 may be used including e.g., whisks, paddles, dough hooks, beaters, and others for purposes of mixing articles or mechanically manipulating articles within bowl 98 or other containers supported by base 104. During use, attachment support 110 with mixing shaft 200 may rotate attachment 108 in a circular or planetary fashion. Spinning in a planetary fashion, as used herein, includes spinning an object (e.g., shaft 200) about a first axis and spinning the object about a second axis, the object offset from the second axis. For example, shaft 200 may spin about a shaft axis SA, and spin about a central axis CA, shaft 200 offset from central axis CA to generate spinning in a planetary rotation. Shaft axis SA may also be offset from central axis CA. In some embodiments, motor 142 may be disposed within base 104, including within upright support 112.

Figure 4:
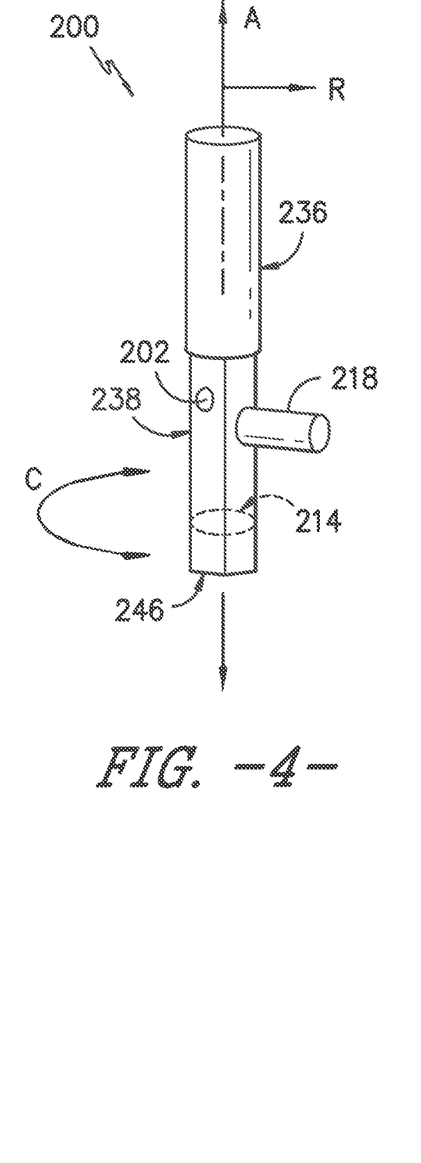
FIG. 4 provides a perspective view of the example mixing shaft of FIG. 1 according to exemplary embodiments of the present disclosure.

As shown in FIG. 2, mixing shaft 200 may rotate within attachment support 110. Locked mixing attachment 108 and mixing shaft 200 are rotatable by motor 142 in planetary rotation. Mixing shaft may define an axial direction A, with a radial direction R extending therefrom, and a circumferential direction C extending around axial direction (as shown in FIG. 4). Mixing shaft 200 may rotate around axial direction A, mixing shaft 200 further rotating in circumferential direction C in addition to axial direction A. According to the arrangement, axial direction A may correspond to shaft axis SA in some embodiments. Additionally or alternatively, motor 142 may be operable to selectively rotate mixing attachment 108 in a clockwise direction or a counterclockwise direction in circumferential direction C around axial direction A. Mixing shaft 200 may define axial direction A, with radial direction R extending therefrom, and circumferential direction C defined around mixing shaft 200. Thus, mixing shaft 200 may be reversible, or moveable in either direction during use. Attachment of mixing attachment 108 to shaft 200 allows for motion in both directions, clockwise and counterclockwise, by motor 142. In other words, motor 142 can rotate mixing attachment 108 or shaft 200 in a clockwise direction and can switch and rotate mixing attachment 108 or shaft 200 in a counterclockwise direction. Such movement may be directed by a user (e.g., by use of controls 150) or may be directed independent of a user, e.g., by using a timer, by using a controller in operable communication with motor 142, or as otherwise understood.

Figure 5:
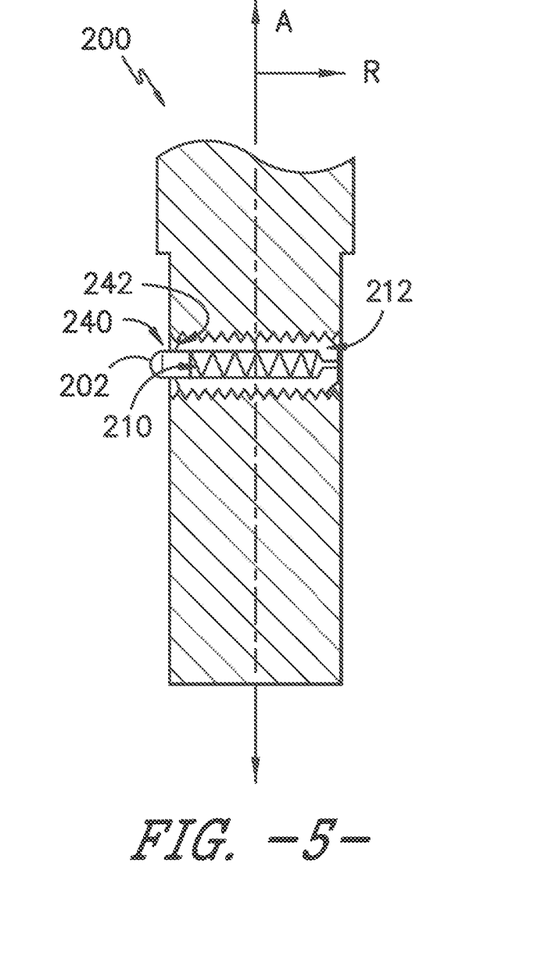
FIG. 5 provides a cross section view of the example mixing shaft of FIG. 4 in a second position according to exemplary embodiments of the present disclosure.
Figures 6, 7:
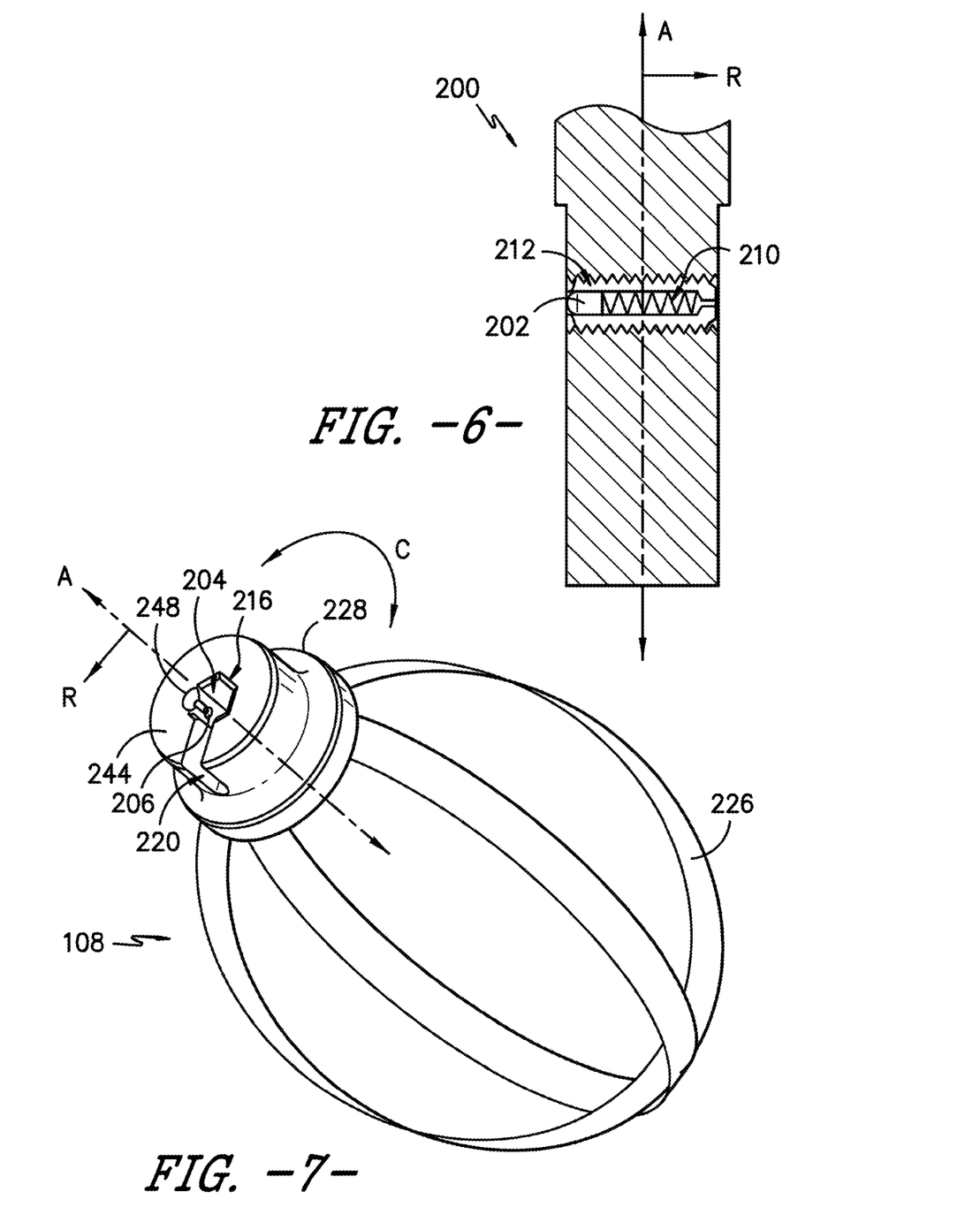
FIG. 6 provides a cross section view of the example mixing shaft of FIG. 4 in a first position according to exemplary embodiments of the present disclosure.
FIG. 7 provides a perspective view of the example mixing attachment of FIG. 2 according to exemplary embodiments of the present disclosure.

Turning generally to FIGS. 3 through 9, FIG. 3 depicts mixer appliance 100 with mixing attachment 108 and bowl 98 removed. FIG. 4 depicts a partial perspective view of shaft 200. As shown, mixing shaft 200 defines a plunger chamber 212 (as shown in FIG. 5) and includes a retractable plunger 202. Retractable plunger 202 may be contained within plunger chamber 212, as will be described in more detail below. Mixing shaft 200 may also include a resilient element (e.g., spring 210) connected to plunger 202 (e.g., as shown in FIGS. 5 and 6). Resilient element (e.g., spring 210) may additionally be a hydraulic system, an air compression system, or an equivalent structure. In some embodiments, mixing shaft 200 includes an alignment rod 218, which will be described in more detail below. In some embodiments, mixing shaft 200 further includes an upper portion 236 and a lower portion 238. Mixing shaft 200 is a rod extending vertically below attachment support 110. Mixing shaft 200 is coupled to motor 142. Coupling to motor 142 may be a direct coupling or may be an indirect coupling, such as through drivetrain 144 or gears 146.

Figure 3:
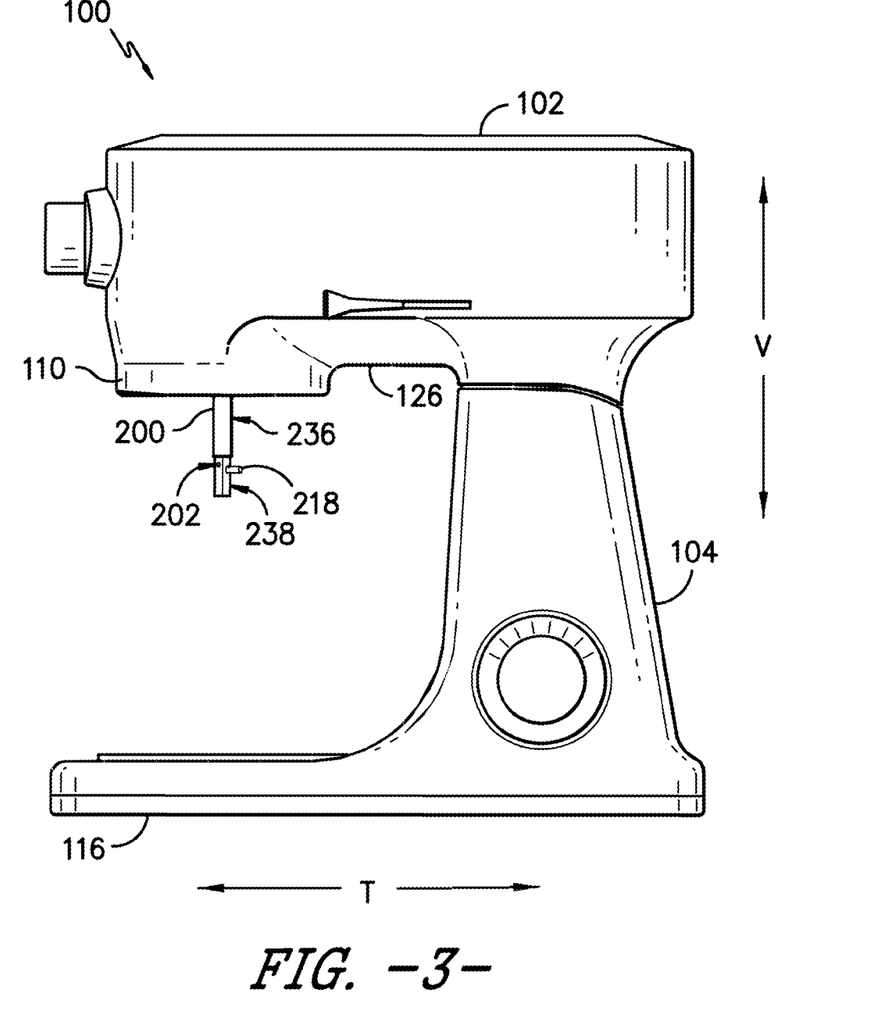
FIG. 3 provides a perspective view of the example stand mixer of FIG. 1 according to exemplary embodiments of the present disclosure.

Upper portion 236 is generally above lower portion 238 along the vertical direction V (e.g., which may correspond to the axial direction A). In some embodiments, mixing shaft 200 has a different shape between upper portion 236 and lower portion 238. For example as shown, upper portion 236 has a cylindrical shape with a circular cross-sectional shape and lower portion 238 has a noncircular cross-sectional shape. As shown in FIG. 4, lower portion 238 may have a hexagonal cross-sectional shape 214 in a plane orthogonal to axial direction A. In some embodiments, upper portion 236 may be inside attachment support 110 or inside head 102 of mixer appliance 100. As shown in FIG. 3, in some embodiments, upper portion 236 extends below (in axial direction A or in vertical direction V) attachment support 110 or head 102. In certain embodiments, shaft 200 may have noncircular cross-sectional shape, such as hexagonal cross-sectional shape 214, along a majority or along the entirety of shaft 200. In some embodiments, noncircular cross-sectional shape of shaft 200 has at least three corners or at least three sides.

As shown in FIGS. 3 and 4, alignment rod 218 extends from mixing shaft 200 along radial direction R. Alignment rod 218 may be any shape, such as a cylindrical shape or a cubic shape. In some embodiments. Alignment rod 218 is offset in circumferential direction C from retractable plunger 202, which resides in plunger chamber 212 (as shown in FIG. 5).

Retractable plunger 202 is moveable in a radial direction R. FIG. 5 shows retractable plunger 202 in a second position or an extended position. FIG. 6 shows retractable plunger 202 in a first position or a retracted position. Retractable plunger 202 is extendable along radial direction R from mixing shaft 200. Plunger is extendable between first position into mixing shaft 200 and second position extending from mixing shaft 200. In first position, retractable plunger 202 may be flush or mostly flush with shaft in radial direction R Spring 210 may be compressed around plunger 202 in first position. In second position, plunger 202 may extend in radial direction R from shaft 200. Spring 210 is relaxed around plunger 202 in second position. Generally, spring 210 is positioned to urge plunger 202 toward second position.

In some embodiments, retractable plunger 202, spring 210 and plunger chamber 212 may be a plunger sub-assembly 240, plunger sub-assembly 240 insertable within mixing shaft 200 within a sub-assembly cavity 242, as shown in FIG. 5. Plunger sub-assembly 240 may be inserted into mixing shaft 200 by compression fitting, screw grooves and flanges, adhesives, or as otherwise understood. Spring 210 and plunger 202 may be contained in plunger sub-assembly 240 by screwing means, compression fitting, adhesives, or as otherwise understood.

Turning to FIG. 7, which shows mixing attachment 108, mixing attachment 108 includes an attachment head 228 and at least one mixing apparatus (shown as a plurality of paddles 226 in FIG. 7). Mixing attachment 108 further defines a shaft channel 204 for sliding receipt of mixing shaft 200. Shaft channel 204 extends along axial direction A when mixing attachment 108 is attached to shaft 200. As shown, shaft channel 204 extends through a central portion of attachment head 228. In some embodiments, shaft channel 204 may extend through a portion of attachment head 228 or through all of attachment head 228. Additionally or alternatively, mixing attachment 108 may include an attachment top 244. As shown, attachment top 244 is located axially above the rest of mixing attachment 108.

Generally, shaft channel 204's noncircular cross-sectional shape (e.g., hexagonal cross-sectional shaft channel shape 216) corresponds to the shape of shaft 200's cross-sectional shape (e.g., hexagonal cross-sectional shape 214). In certain embodiments, shaft channel 204 may have noncircular cross-sectional shape, such as hexagonal cross-sectional shaft channel shape 216, along shaft channel 204 in axial direction A. In other words, mixing shaft 200 may include hexagonal cross-sectional shaft channel shape 216 in a plane orthogonal to axial direction A. In some embodiments, the noncircular cross-sectional shape of shaft channel 204 may have at least three corners or at least three sides. The matching shape of shaft channel 204 to shaft 200 may prevent or decrease movement of mixing attachment 108 relative to shaft 200 during movement of shaft 200 relative to head 102 of mixer appliance 100 by motor 142. As shown in FIG. 7, shaft channel 204 may form hexagonal cross-sectional shaft channel shape 216 that corresponds to cross-sectional shape 214 of shaft 200. During use, mixing attachment 108 is prevented from rotating relative to mixing shaft 200 when mixing attachment 108 is attached to mixing shaft 200. The corners and edges of shaft 200 and shaft channel 204 may secure or aid in securing mixing attachment 108 to shaft 200 in circumferential direction C. Advantageously, secure attachment of mixing attachment 108 to shaft 200 may allow motor 142 to rotate shaft 200 with secured mixing attachment 108 in either a clockwise or a counterclockwise direction. In other words, motor 142 may switch between a clockwise and a counterclockwise rotation of shaft 200 (e.g., including planetary rotational patterns, and axial rotation or rotation about axial direction A), with mixing attachment 108 remaining securely attached to shaft 200 during both directions of rotation.

As shown, mixing attachment 108 further defines an aperture 206 connected with shaft channel 204. Aperture 206 may be configured for selective receipt of retractable plunger 202 when in second position (i.e., plunger 202 extended from shaft 200 in radial direction R). Aperture 206 may be sized to allow retractable plunger 202 to extend into second position when in aperture 206.

Figure 9:
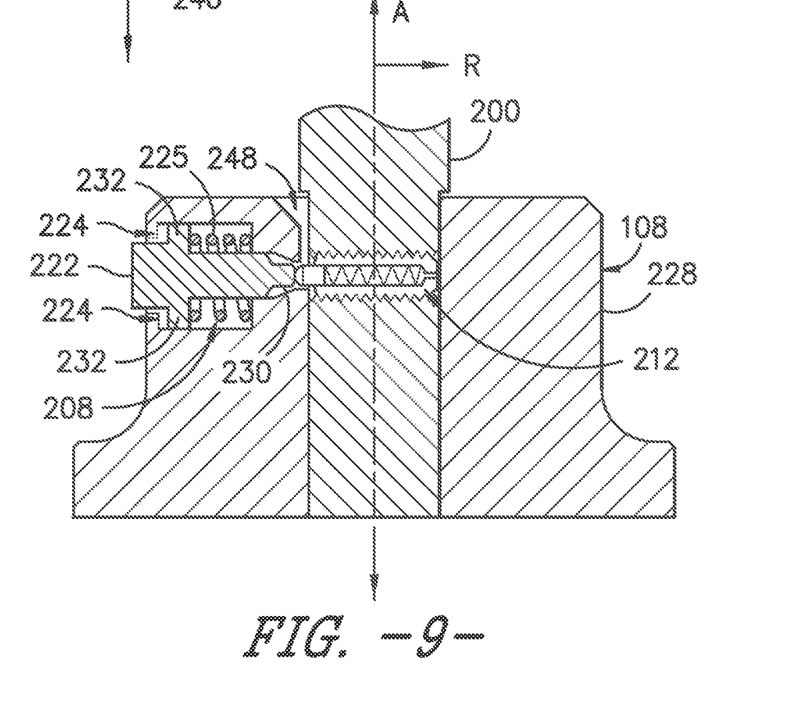
FIG. 9 provides a cross section view of the example mixing shaft and the exemplary mixing attachment of FIG. 8 according to exemplary embodiments of the present disclosure.

Additionally or alternatively, mixing attachment 108 also defines a plunger track 248 extending along axial direction A adjacent to shaft channel 204. During use, plunger track 248 may be for sliding receipt of plunger 202 as mixing shaft 200 moves along shaft channel 204, plunger track 248 connected with aperture 206. As shown in FIGS. 7 and 9, plunger track 248 extends radially into mixing attachment 108 from shaft channel 204. Plunger track 248 may also extend along shaft channel 204 in axial direction A, widening in a partial conical shape upwards towards attachment support 110 and connecting with aperture 206 downwards into shaft channel 204 towards mixing paddles 226 or towards bowl 98. Plunger track 248 radially extends from shaft channel 204 in radial direction R, with a conical shape that is widest at attachment top 244. In some embodiments, plunger track 248 may continue from the point of the conical shape into a cylindrical or half pipe shape as it extends towards aperture 206. Plunger track 248 then decreases in a length in circumferential direction C axially downward, connecting to aperture 206.

Figure 8:
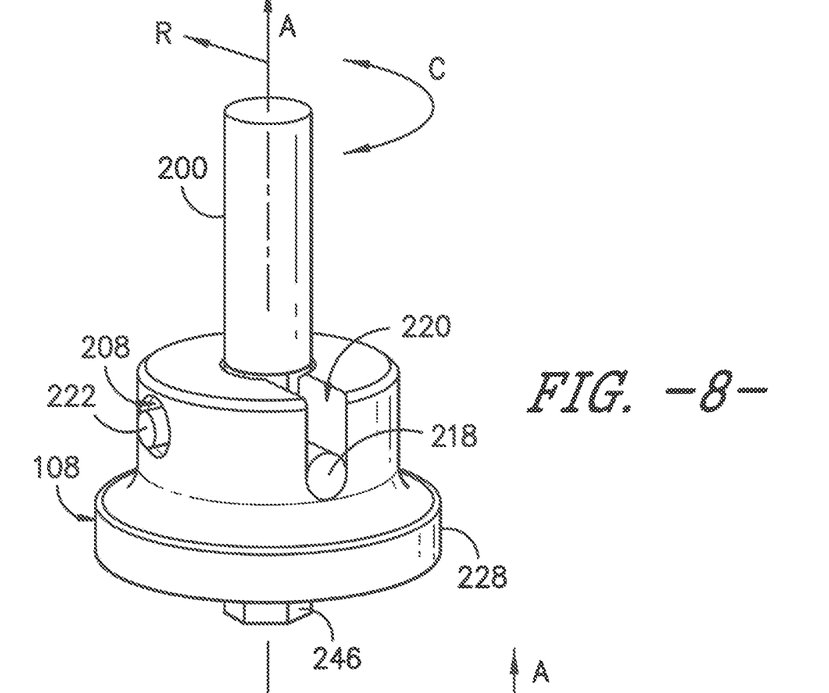
FIG. 8 provides a perspective view of a portion of an example mixing shaft and a portion of an exemplary mixing attachment of FIG. 1 according to exemplary embodiments of the present disclosure.

FIG. 8 depicts mixing attachment 108 (e.g., attachment head 228) attached to shaft 200. Aperture 206 may be sized to allow retractable plunger 202 to extend into second position when in aperture 206. In some embodiments, aperture 206 is deeper than surrounding plunger track 248 (e.g., as seen in FIG. 9) in radial direction R. In some embodiments, mixing shaft 200 can be inserted into shaft channel 204 (e.g., at bottom end of shaft 246) and moved along axial direction A to selectively lock mixing attachment 108 to mixing shaft 200 by receipt of retractable plunger 202 into second position and into aperture 206 of mixing attachment 108. As shown, placing plunger 202 into aperture 206 locks mixing attachment 108 to shaft 200. According to the arrangement, plunger 202 locked into aperture 206 aids in restricting movement of mixing attachment 108 in relation to shaft 200, for example, in axial direction A.

Optionally, mixing attachment 108 defines a rod channel 220. As shown in FIGS. 7 and 8, rod channel 220 may extend radially out from shaft channel 204. In some embodiments, rod channel 220 may extend along axial direction A. For example, rod channel 220 may extend downwards from attachment top 244. Generally, rod channel 220 is configured for sliding receipt of alignment rod 218. Rod channel 220 is further sized to allow alignment rod 218 to fit into rod channel 220. During use, rod channel 220 may be aligned with alignment rod 218 to aid in attaching mixing attachment 108 to shaft 200. Alignment rod 218 may be configured to align plunger track 248 of mixing attachment 108 with retractable plunger 202. Seating alignment rod 218 into rod channel 220 may align retractable plunger 202 with aperture 206, securing mixing attachment 108 onto mixing shaft 200. As shown, rod channel 220 is offset (e.g., in circumferential direction C) from retractable plunger 202 on attachment head 228 of mixing attachment 108.

As shown in FIGS. 8 and 9, stand mixer appliance 100 further includes a release button 222 and a chamber 208 defined by mixing attachment 108. FIG. 9 depicts a cross sectional view of shaft 200 and mixing attachment 108, including chamber 208 and release button 222. Chamber 208 for release button 222 is located adjacent to aperture 206. As shown, chamber 208 may be farther from shaft channel 204 in radial direction R than aperture 206. In some embodiments, chamber 208 is connected to aperture 206 or to plunger track 248. As shown, chamber 208 may house release button 222 within it. Release button 222 further extends from chamber 208 in radial direction R in some embodiments.

Release button 222 positioned in chamber 208 is moveable along radial direction R towards and away from aperture 206. As shown in FIG. 9, release button 222 may contact plunger 202 in second position and mixing attachment 108 is secured on mixing shaft 200. In other words, release button 222 may contact plunger 202 when plunger 202 is locked in aperture 206. During use, release button 222 may push plunger 202 from second position towards first position. Accordingly, release button 222 may unlock plunger 202 from aperture 206, allowing shaft 200 and mixing attachment 108 to disconnect from one another. As shown in FIG. 9, release button 222 extends along radial direction R from mixing shaft 200.

In some embodiments, release button 222 includes button flanges 232, located axially above or below a main body of release button 222. During use, button flanges 232 guide release button 222 in radial direction R along chamber 208 to compress retractable plunger 202 into first position.

In some embodiments, at least one retention flange 224 may extend around chamber 208 to hold release button 222 in chamber 208. Retention flanges 224 may extend around an opening to chamber 208 or may extend as tabs extending into chamber 208 (e.g., as shown as opposing retention flanges 224 in FIG. 9). In certain embodiments, a button spring 225 coils around release button 222. Button spring 225 may bias release button 122 outward from shaft 200 in radial direction R, locking mixing attachment 108 onto shaft 200 unless release button 222 is compressed toward plunger 202 in radial direction R. In some embodiments, button spring 225 may be a compression spring. In some embodiments, button spring 225 may restrain release button 222 in chamber 208. Additionally or alternatively, equivalent mechanisms may restrain release button 222 in chamber 208 or bias release button 222 in radial direction R away from shaft 200. For example, release button 220 may be retained within chamber 208 by a circlip, a snap ring, or a press foot ring.

In some embodiments, release button 222 includes button end 230. Button end 230 may be in physical contact with retractable plunger 202. In some embodiments, button end 230 is only in contact with retractable plunger 202 during movement of button 222 to compress retractable plunger 202 into first position. In some embodiments, and as shown in FIG. 9, retractable plunger 202 is in contact with button end 230 when mixing attachment 108 is attached to shaft 200, whether retractable plunger 202 is locked in second position in aperture 206 or retractable plunger 202 is unlocked and not in second position (e.g., when plunger 202 is compressed into first position).

Additionally or alternatively, chamber 208 may be an empty chamber in some embodiments. A pin, rod, or other equivalent structure may be inserted into chamber 208 to release mixing attachment 108 from shaft 200, pressing plunger 202 into first position to release mixing attachment 108 from shaft 200.

Aspects of the present subject matter are directed to a method and system to enable reversibility on a stand mixer attachment that may add ease of use to loading and unloading stand mixer attachments, may provide strong and secure locking of any attachment, and may allow all attachments to be used in forward and reverse. The system may have a locking mechanism on a stand mixer that uses a hex end motor shaft which encompasses a spring-loaded plunger within the shaft. The attachment head may have a ramped top and guide channel which the spring-loaded plunger may fall into and may be pushed back. When the attachment is slid further onto the shaft the compressed spring plunger may fall into a hole on the attachment top. This may prevent the attachment from moving up or down and the hex shaft may prevent the attachment from rolling side to side. There may further be a stepped push button on the side of the attachment as a release. When the button is pushed it may press the spring plunger in, allowing the attachment to be released from the motor shaft.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A stand mixer, comprising:
   a motor;
   a mixing shaft coupled to the motor and defining an axial direction, the mixing shaft rotatable by the motor about the axial direction;
   a retractable plunger extendable along a radial direction from the mixing shaft, the retractable plunger extendable between a first position into the mixing shaft and a second position extending from the mixing shaft; and
   a mixing attachment removably attached to the mixing shaft, the mixing attachment defining a shaft channel extending along the axial direction for sliding receipt of the mixing shaft, the mixing attachment also defining an aperture connected with the shaft channel and configured for selective receipt of the retractable plunger when in the second position,
   wherein the mixing shaft can be inserted into the shaft channel and moved along the axial direction to selectively lock the mixing attachment to the mixing shaft by receipt of the retractable plunger into the second position and into the aperture of the mixing attachment.

2. The stand mixer of claim 1, wherein the motor is operable to selectively rotate the mixing attachment in a clockwise direction and a counterclockwise direction around the axial direction.

3. The stand mixer of claim 1, wherein the mixing shaft further comprises a resilient element, and
   wherein the mixing shaft defines a plunger chamber containing the retractable plunger and the resilient element, the resilient element positioned to urge the retractable plunger towards the second position.

4. The stand mixer of claim 1, the mixing attachment further comprising a plunger track extending along the axial direction adjacent to the shaft channel, the plunger track configured for sliding receipt of the retractable plunger as the mixing shaft moves along the shaft channel, the plunger track connected with the aperture.

5. The stand mixer of claim 1, wherein the mixing shaft comprises a noncircular cross-sectional shape and the shaft channel comprises a complementary noncircular cross-sectional shape such that the mixing attachment is prevented from rotating relative to the mixing shaft when the mixing attachment is attached to the mixing shaft.

6. The stand mixer of claim 5, wherein the mixing shaft further comprises a hexagonal cross-sectional shape in a plane orthogonal to the axial direction.

7. The stand mixer of claim 1, further comprising
   a plunger track extending along the axial direction adjacent to the shaft channel of the mixing attachment, the plunger track configured for sliding receipt of the retractable plunger as the mixing shaft moves along the shaft channel;
   an alignment rod extending from the mixing shaft along the radial direction; and
   a rod channel defined by the mixing attachment, the rod channel extending along the axial direction and configured for sliding receipt of the alignment rod,
   wherein the alignment rod is configured to align the plunger track of the mixing attachment with the retractable plunger.

8. The stand mixer of claim 1, further comprising
   a release button;
   a chamber defined by the mixing attachment and located adjacent to the aperture, the release button positioned in the chamber and movable along the radial direction towards and away from the aperture; and
   whereby the release button is configured to push the retractable plunger from the second position towards the first position so as to allow the mixing attachment to be removed from the mixing shaft.

9. The stand mixer of claim 8, wherein the release button is retained within the chamber, and oriented at an opening of the chamber by one of: a retention flange, a circlip, a snap ring, and a press foot ring.

10. The stand mixer of claim 9, wherein the release button contacts the retractable plunger when in the second position and the mixing attachment is secured on the mixing shaft.

11. A stand mixer comprising:
    a motor;
    an attachment support coupled to the motor;
    a mixing shaft coupled to the motor and to the attachment support and defining an axial direction, the mixing shaft rotatable by the motor about the axial direction;
    a retractable plunger extendable along a radial direction from the mixing shaft, the retractable plunger extendable between a first position in the mixing shaft and a second position extending from the mixing shaft; and
    a mixing attachment removably attached to the mixing shaft, the mixing attachment defining a shaft channel extending along the axial direction for sliding receipt of the mixing shaft, the mixing attachment also defining an aperture connected with the shaft channel for selective receipt of the retractable plunger when in the second position,
    wherein the mixing shaft can be inserted into the shaft channel and moved along the axial direction to selectively lock the mixing attachment to the mixing shaft by receipt of the retractable plunger into the second position and into the aperture of the mixing attachment, and wherein the motor is operable to selectively rotate the mixing attachment in a clockwise direction and a counterclockwise direction around the axial direction.

12. The stand mixer of claim 11, wherein the mixing shaft is rotatable by the motor in a planetary rotation, the mixing shaft rotating around a shaft axis extending along the mixing shaft, and the attachment support spinning about a central axis, the central axis extending in the axial direction.

13. The stand mixer of claim 11, wherein the mixing shaft comprises a chamber containing the retractable plunger and a spring, the spring positioned to urge the retractable plunger towards the second position.

14. The stand mixer of claim 11, further comprising a plunger track extending along the axial direction adjacent to the shaft channel, the plunger track configured for sliding receipt of the retractable plunger as the mixing shaft moves along the shaft channel, the plunger track connected with the aperture.

15. The stand mixer of claim 11, wherein the mixing shaft comprises a noncircular cross-sectional shape and the shaft channel comprises a corresponding noncircular cross-sectional shape such that the mixing attachment is prevented from rotating relative to the mixing shaft when the mixing attachment is attached to the mixing shaft.

16. The stand mixer of claim 11, wherein the mixing shaft further comprises a hexagonal cross-sectional shape in a plane orthogonal to the axial direction.

17. The stand mixer of claim 11, further comprising
a plunger track extending along the axial direction adjacent to the shaft channel, the plunger track configured for sliding receipt of the retractable plunger as the mixing shaft moves along the shaft channel;
an alignment rod extending from the mixing shaft along the radial direction; and
a rod channel defined by the mixing attachment, the rod channel extending along the axial direction and configured for sliding receipt of the alignment rod,
wherein the alignment rod is configured to align the plunger track of the mixing attachment with the retractable plunger.

18. The stand mixer of claim 11, further comprising
a release button;
a chamber defined by the mixing attachment and located adjacent to the aperture, the release button positioned in the chamber and movable along the radial direction towards and away from the aperture; and
whereby the release button is configured to push the retractable plunger from the second position towards the first position so as to allow the mixing attachment to be removed from the mixing shaft, and
wherein the release button extends along the radial direction from the mixing shaft.

* * * * *